Sept. 6, 1932. T. C. McKINLEY 1,875,474
APPARATUS FOR PRODUCING MOLTEN GLASS
Filed Dec. 23, 1927
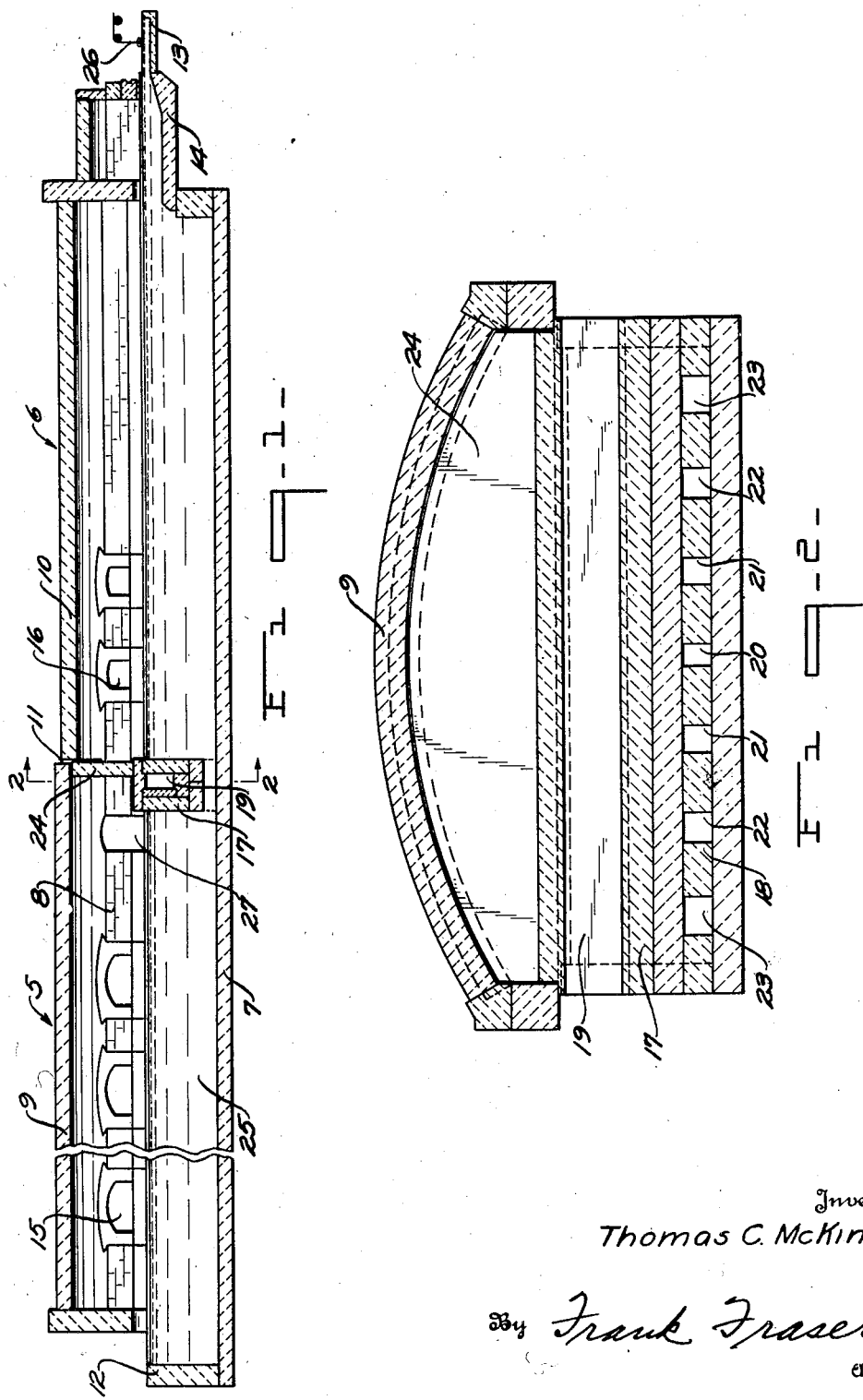
Inventor
Thomas C. McKinley
By Frank Fraser
Attorney Patented Sept. 6, 1932

1,875,474

UNITED STATES PATENT OFFICE

THOMAS C. McKINLEY, OF CHARLESTON, WEST VIRGINIA, ASSIGNOR TO LIBBEY-OWENS-FORD GLASS COMPANY, OF TOLEDO, OHIO, A CORPORATION OF OHIO

APPARATUS FOR PRODUCING MOLTEN GLASS

Application filed December 23, 1927. Serial No. 242,088.

This invention relates to an improved method and apparatus for producing molten glass and is particularly applicable in connection with the supplying of molten glass to glassware forming machines although not necessarily restricted to such use.

An important object of the present invention is to provide a method and apparatus wherein a mass of molten glass is both melted and refined in a single receptacle or tank and whereby that portion of the glass being melted may be treated independently of and without affecting that portion of the glass passing through its refining stage and vice versa.

Another object of the invention is to provide a method and apparatus wherein a mass of molten glass is melted preferably in one end of a receptacle or tank and the subsurface glass caused to flow from said mass into the opposite end of said receptacle or tank or into an entirely separate container wherein it may be properly refined, the flow movement of the glass being substantially equalized throughout its width as it flows into the opposite or refining end of said receptacle or tank or into the separate container.

Another object of the invention is to provide a glass melting furnace including a melting end and a refining end having independent heating means associated therewith, means being provided for separating the heated atmosphere in the melting end from the heated atmosphere in the refining end and vice versa, whereby the most desirable conditions may be obtained in the melting and refining of the glass.

A further object is to provide a glass melting furnace including a melting chamber wherein is created a mass or body of molten glass and a refining chamber for receiving the molten glass therefrom, means being provided for causing sub-surface glass only to flow from the former into the latter, and means being also provided for substantially equalizing the flow movement of this glass.

A more specific object is to provide a glass melting furnace including a melting chamber wherein is created a mass or body of molten glass and a refining chamber for receiving the molten glass therefrom, and wherein is utilized a guide or partition wall arranged within the furnace at substantially the juncture of said melting and refining chambers and beneath which the glass is caused to flow from the former into the latter, the glass being adapted to pass through a plurality of openings provided beneath said bridge wall and which openings are of relative sizes to cause a substantial equalization of the flow movement of the glass passing therethrough.

Other objects and advantages of the invention will become more apparent during the course of the following description when taken in connection with the accompanying drawing.

In the drawing forming a part of this application and wherein like numerals are employed to designate like parts throughout the same, Fig. 1 is a vertical longitudinal section through a glass melting furnace constructed in accordance with the present invention, and Fig. 2 is a transverse section taken substantially on line 2—2 of Fig. 1.

In the production of sheet glass, the temperature treatment of the molten glass is of vital importance. The glass must pass from a highly heated molten state to a condition where it can be formed or drawn into a sheet. The present invention, while having particular reference to the Colburn type of machine, wherein a sheet is continuously drawn from the surface of a mass of molten glass, is of course not necessarily limited thereto.

In certain types of furnaces heretofore used in the production of sheet glass or other kinds of glassware, the molten glass is produced in one end of the furnace, which is usually termed the melting end, after which the glass is allowed to flow into the opposite or refining end thereof. The molten glass then passes through a cooling zone into a working receptacle from which it may be drawn away in sheet form or worked into other kinds of glass articles. In such furnaces, the heated atmosphere in the melting end thereof has ordinarily been permitted to pass into the refining end and thence through the cooling zone so that any fluctuations in the melting end will be transmitted to the refining end sometimes causing detrimental effects upon the glass being treated therein.

As brought out in the above objects, the aim of the present invention is to provide means for independently controlling the temperature of the glass during the melting and refining thereof and to separate the melting and refining ends of the furnace so that the heated atmosphere in the melting chamber cannot pass into the refining chamber or vice versa. Thus, the fire in either the melting chamber or refining chamber can be run to best suit conditions in said chamber and without having to consider, as is necessary with the above construction, what effect this fire may have upon the glass in the other chamber. In addition, the present invention embodies means for causing the sub-surface glass to flow from the melting chamber into the refining chamber and for substantially equalizing the flow movement of this glass as it passes from the former into the latter.

The improved furnace illustrated in the accompanying drawing and constructed in accordance with the present invention includes a melting end or chamber 5 and a refining end or chamber 6, said chambers being arranged on the same level and having preferably a common bottom or floor 7, side walls 8 and individual cover arches or caps 9 and 10, the adjacent ends of said caps being separated to permit an expansion joint 11.

The melting end 5 may be provided with an open compartment or dog-house 12 through which the raw glass batch ingredients may be introduced into the furnace while there may be provided at the opposite end of said furnace a relatively shallow working receptacle 13 connected with the refining chamber 6 through the cooler chamber 14. The melting and refining chambers 5 and 6 are adapted to be independently heated by means of regenerators associated therewith and located at the opposite sides thereof, the gas flames issuing from these regenerators into the melting and refining chambers through ports 15 and 16 respectively.

In carrying out the present invention, there is arranged within the furnace at approximately the juncture of the melting and refining chambers 5 and 6, a guide or bridge wall 17, this wall being constructed of any suitable refractory material and being supported upon a plurality of spaced blocks 18. The bridge wall 17, which may be of any desired shape in cross section, is preferably hollow and provided with an opening 19 extending longitudinally therethrough in order that a suitable temperature control medium such as air or the like may be circulated through said walls in order to maintain the same at the desired temperature. As shown, the bridge wall 17 projects downwardly into the molten glass and terminates a desired distance from the furnace bottom 7, the supporting blocks 18 being spaced from one another to provide a plurality of openings therebetween through which the sub-surface glass is caused to flow from the melting chamber into the refining chamber.

As shown most clearly in Fig. 2, the blocks 18 are of such a number that seven openings are provided through which the glass flows from the melting chamber into the refining chamber. While seven openings have been shown, it is to be understood that any desired number may be used. The center opening 20 is preferably the smallest, while the adjacent openings 21 at the opposite side thereof are slightly larger with the next adjacent openings 22 and 23 being increased respectively in size. Such an arrangement is particularly desirable in that it will tend to substantially equalize the flow movement of the molten glass throughout its entire width as the said glass passes from the melting chamber into the refining chamber.

In the production of molten glass in such a type of furnace as has been above described, there is a tendency for the border portions of the molten glass within the melting tank or chamber to be relatively cooler than the central portion or body thereof, this being due to the contact of the border portions of the glass with the side walls of the furnace and the consequent loss of heat dissipated therethrough. Since the border portions are relatively cooler than the central body of glass, they will tend to move somewhat more sluggishly than the hotter central portion thereof. Consequently, the openings beneath the bridge wall are of such relative sizes as to cause a substantial equalization of the flow movement of the glass passing therethrough. For instance, the hotter central flow of glass passing through the relatively small center opening 20 will be retarded to the greatest degree and this retarding effect will be gradually decreased from the center toward the opposite sides of the furnace to compensate for the gradual cooling of the glass toward the border portions thereof. Thus, the glass flowing into the refining chamber 6 will have a substantially uniform flow movement throughout its entire width.

The present invention also includes means for preventing the heated atmosphere in the melting chamber from passing into and mixing with the heated atmosphere in the refining chamber and vice versa to the end that the fire in either chamber can be run to best suit conditions in that particular chamber and without having any detrimental effect upon the glass in the other chamber. This is accomplished preferably by the provision of a curtain wall 24 resting, by preference, upon the bridge wall 17 and extending upwardly to the furnace cap 9.

In operation, the raw glass batch ingredients are first introduced into the furnace through the dog-house 12 and melted within the melting end or chamber 5 to produce a mass or body of molten glass 25. This glass is then allowed to flow through the openings beneath the bridge wall 17 into the refining end or chamber 6 and thence through the cooling chamber 14 into the working receptacle or draw pot 13 from which it may be drawn or otherwise formed into a sheet 26. Any scum etc., which might form upon the surface of the glass within the melting chamber will be caught by the bridge wall 17 and may be removed through the skimming opening 27. The entire tank or any portion thereof may be insulated if desired.

Due to the provision of the curtain wall 24, the temperature conditions at one end of the furnace can be regulated without affecting the temperature conditions at the opposite end thereof so that a desirable condition set up in the refining chamber will not be affected by changing conditions in the melting chamber and vice versa. Often times it is found necessary to vary the temperature conditions in the melting end of the tank and obviously where the melting end and refining end are in open communication, these changes will be transmitted to the latter which frequently causes trouble. By establishing the proper conditions in the melting and refining chambers and maintaining such conditions, the problems of producing uniform, flat and high quality sheets are made much easier.

Furthermore, due to the provision of the bridge wall 17, the molten glass is given a relatively longer time in which to become refined before being formed into a sheet or other glass article. In other words, the glass must first settle to the bottom in the melting end when it leaves the said end and enters the refining end after which the glass then gradually moves upwardly and flows into the cooling chamber and working receptacle. Ordinarily, the longer the glass is permitted to refine, the better quality of glass will be obtained.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In glass apparatus, a tank furnace adapted to contain a mass of molten glass and including a melting chamber and a refining chamber, a bridge wall arranged within the furnace at substantially the juncture of the melting chamber and refining chamber for causing sub-surface glass to flow from the former into the latter, and means providing a plurality of spaced openings beneath said bridge wall through which the glass is caused to flow as it passes from said melting chamber into said refining chamber, said openings increasing respectively in size from the center of the furnace toward the opposite sides thereof.

2. In glass apparatus, a tank furnace adapted to contain a mass of molten glass and including a melting chamber and a refining chamber, a bridge wall arranged transversely within the furnace at substantially the juncture of the melting chamber and refining chamber for causing sub-surface glass to flow from the former into the latter, said bridge wall being constructed so that a temperature control medium may be circulated therethrough, and means for supporting the bridge wall in a manner to provide a plurality of spaced openings therebeneath through which the glass is caused to flow as it passes from the melting chamber into the refining chamber, said openings increasing respectively in size from the center of the furnace toward the opposite sides thereof.

3. In glass apparatus, a tank furnace adapted to contain a mass of molten glass and including a melting chamber and a refining chamber, a bridge wall arranged transversely within the furnace at substantially the juncture of the melting chamber and refining chamber for causing sub-surface glass to flow from the former into the latter, means forming a plurality of spaced openings beneath the bridge wall through which the glass passes from the melting chamber into the refining chamber, said openings increasing respectively in size from the center of the furnace toward the opposite sides thereof, and a curtain wall extending upwardly from the bridge wall for separating the heated atmosphere in the melting chamber from the heated atmosphere in the refining chamber.

4. In glass apparatus, a tank furnace adapted to contain a mass of molten glass and including a melting chamber and a refining chamber, independent heating means associated with said melting and refining chambers, a bridge wall arranged transversely within the furnace at substantially the juncture of the melting chamber and refining chamber for causing sub-surface glass to flow from the former into the latter, said wall being hollow so that a temperature control medium may be circulated therethrough, means for supporting the bridge wall intermediate its ends in such a manner as to provide a plurality of spaced openings therebeneath through which the glass passes from the melting chamber into the refining chamber, said openings increasing respectively in size from the center of the furnace toward the opposite sides thereof, and a curtain wall extending upwardly from the bridge wall for separating the heated atmosphere in the melting chamber from the heated atmosphere in the refining chamber.

5. In glass apparatus, a tank furnace adapted to contain a mass of molten glass and including a melting chamber and a refining chamber for receiving the molten glass from said melting chamber, and a bridge wall arranged transversely within the furnace and having a plurality of openings of different sizes to substantially equalize the flow movement of the molten glass throughout its entire width as the said glass passes through said openings from the melting chamber to the refining chamber.

6. In glass apparatus, a tank furnace adapted to contain a mass of molten glass and including a melting chamber and a refining chamber for receiving the molten glass from said melting chamber, and a bridge wall arranged transversely within the furnace and having a plurality of openings through which the molten glass passes from the melting chamber into the refining chamber, said openings increasing respectively in size from the center of the furnace to the opposite sides thereof.

Signed at Charleston, in the county of Kanawha and State of West Virginia, this 19th day of December, 1927.

THOMAS C. McKINLEY.